United States Patent [19]

Recine

[11] 4,394,941
[45] Jul. 26, 1983

[54] FLUID DISPENSER

[75] Inventor: Giuseppe Recine, Philadelphia, Pa.

[73] Assignee: Thomas L. Shannon, Jr., Philadelphia, Pa.

[21] Appl. No.: 297,691

[22] Filed: Aug. 31, 1981

[51] Int. Cl.³ ............................................. B01D 53/04
[52] U.S. Cl. ...................................... 222/355; 222/361; 222/449
[58] Field of Search ............... 222/307, 354, 355, 361, 222/362, 449, 453, 447, 448

[56] References Cited

U.S. PATENT DOCUMENTS 1,233,791  7/1917  Kaiser .................................. 222/361
3,669,318  6/1972  Goksel ................................. 222/307
4,166,487  9/1979  Spies ................................. 222/355 X

FOREIGN PATENT DOCUMENTS 413131  7/1934  United Kingdom ................ 222/361

Primary Examiner—Joseph J. Rolla
Assistant Examiner—Michael S. Huppert
Attorney, Agent, or Firm—Duffield & Lehrer

[57] ABSTRACT

A fluid dispenser includes a cylindrical body which is open at one end and which has an opening in its side wall adjacent the other end to communicate with fluid material inside a container in which the dispenser is mounted. A second cylinder having openings in opposed side walls is slidably mounted within the body and is connected to a plunger for axially moving the inner cylinder which is normally biased inwardly so that fluid material may pass into the interior of the inner cylinder. As the plunger is activated, a closure member first slides under the opening in the cylindrical body to prevent additional material from leaving the container. Further movement of the plunger pushes the end of the inner cylinder out of the body of the dispenser to expose the opening in the side wall to thereby dispense the fluid material which had been in the interior thereof.

4 Claims, 5 Drawing Figures

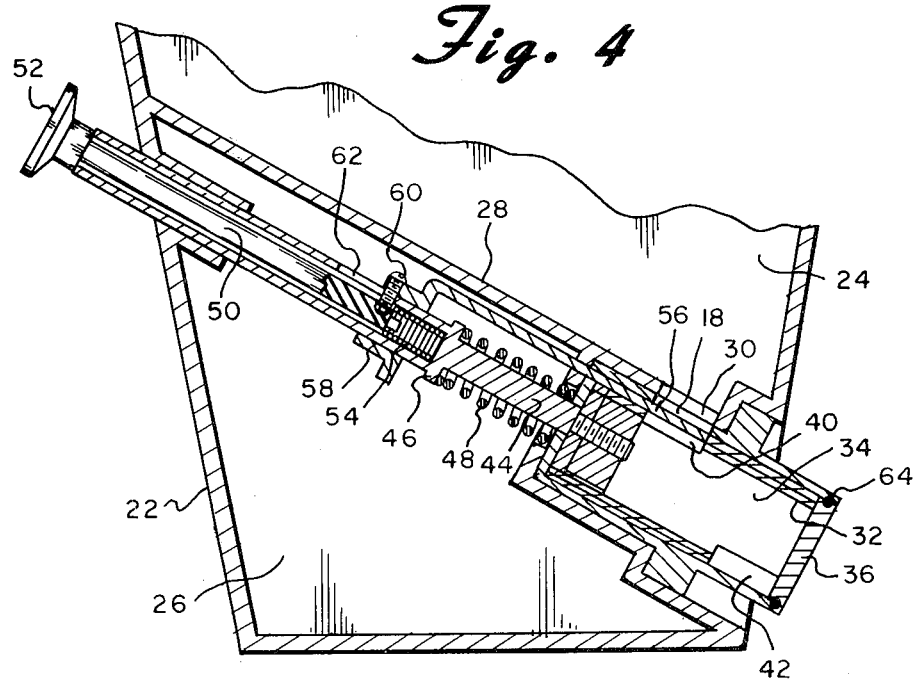
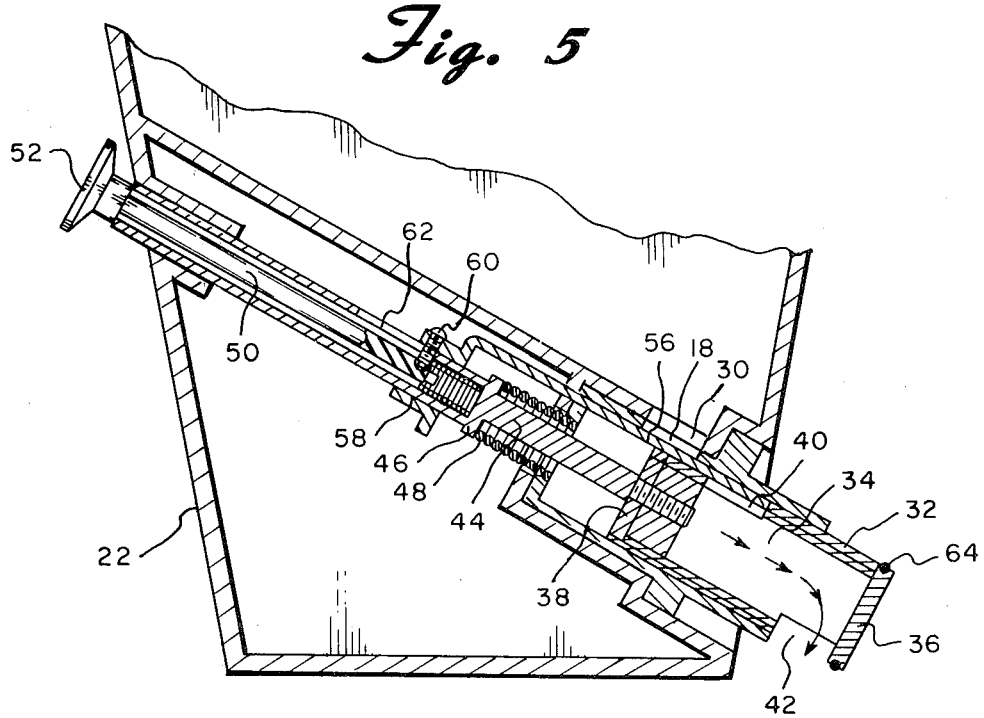

FLUID DISPENSER

BACKGROUND OF THE INVENTION

The present invention is directed toward a dispenser and more particularly toward a dispenser for dispensing granular or particulate material such as sugar, coffee, detergent or the like and for other fluent materials such as liquids.

Dispensers for dispensing measured amounts of such materials and which are of the same general class to which the present invention is directed have been proposed in the past. Such devices are normally mounted in or directly below a container for the fluent material and include an outer housing having an opening therein through which the fluid material enters an inner tubular member having a pair of opposed openings one of which coincides with the opening in the outer member. The inner member may be moved out of the housing to a point where its second opening is exposed so that the fluent material therein is dispensed.

Examples of such prior art dispensers are shown in U.S. Pat. Nos. 795,676; 1,999,624; 2,242,576 and 2,553,509. All of such devices are deficient, however, since they all lack a means for positively preventing the flow of fluent material from the container into the dispenser when the dispenser is in operation. As a result, exact measured amounts cannot be dispensed.

Dispensing devices have also been proposed in the past which are designed to close the opening between the supply chamber and the dispenser before the material is discharged. Examples of these are shown in U.S. Pat. Nos. 2,134,725 and 4,166,487. However, to the best of Applicant's knowledge, no one has ever attempted to utilize such a closure feature with the type of dispenser to which the present invention is directed. There is, however, a need for such an improvement in these dispensers.

SUMMARY OF THE INVENTION

The present invention is believed to overcome the problems of the prior art described above the provides a fluid dispenser which is capable of dispensing an exact measured amount of material. The fluid dispenser of the present invention includes a cylindrical body which is open at one end and which has an opening in its side wall adjacent the other end to communicate with fluid material inside a container in which the dispenser is mounted. A second cylinder having openings in opposed side walls is slidably mounted within the body and is connected to a plunger of axially moving the inner cylinder which is normally biased inwardly so that fluid material may pass into the interior of the inner cylinder. As the plunger is activated, a closure member first slides under the opening in the cylindrical body to prevent additional material from leaving the container. Further movement of the plunger pushes the end of the inner cylinder out of the body of the dispenser to expose the opening in the side wall to thereby dispense the fluid material which had been in the interior thereof.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 4 is a view similar to FIG. 3 but showing the slide closure in place prior to discharge, and FIG. 5 is a cross-sectional view similar to FIGS. 3 and 4 but showing the dispenser in the discharge mode.

DETAILED DESCRIPTION OF THE PREFERRED EMBODIMENT

Figure 1:
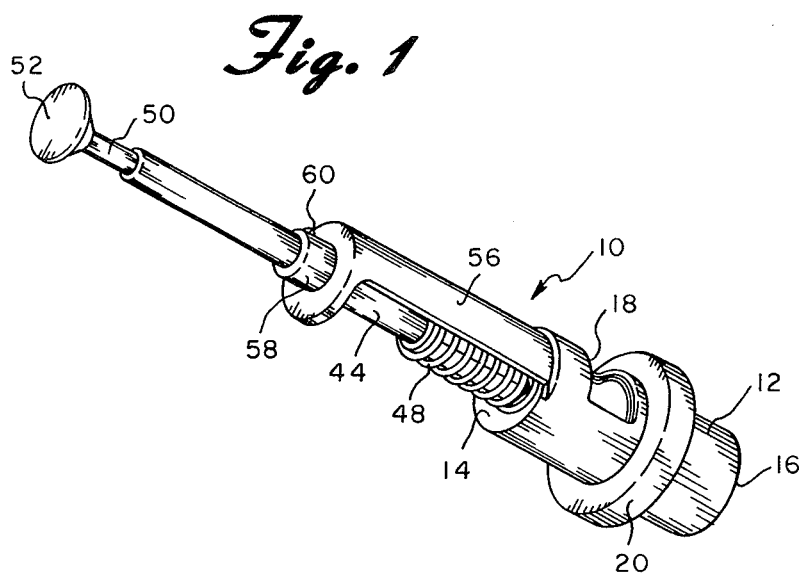
FIG. 1 is a perspective view of a fluid dispenser constructed in accordance with the principles of the present invention.
Figure 2:
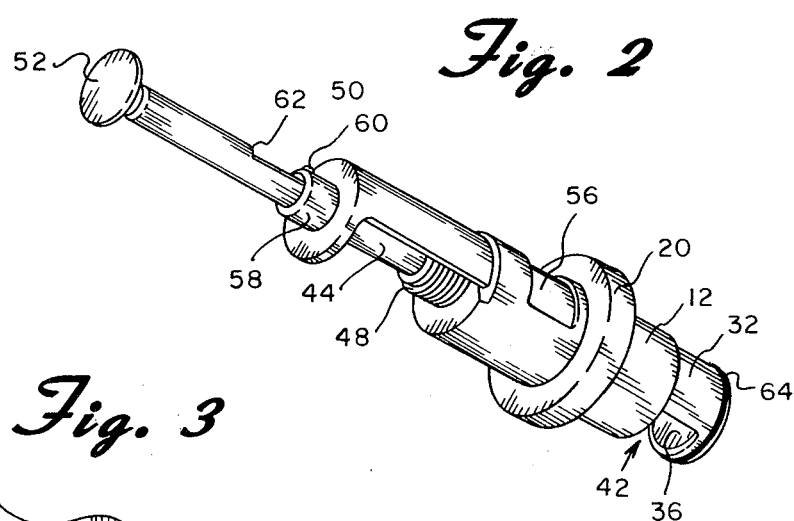
FIG. 2 is a view similar to FIG. 1 but showing the same in the discharge mode.

Referring now to the drawings in detail wherein like reference numerals have been used throughout the various figures to designate like elements, there is shown in FIG. 1 a fluid dispenser constructed in accordance with the principles of the present invention and designated generally as 10. Dispenser 10 includes an outer tubularly shaped body member 12 which, in the preferred embodiment, is cylindrically shaped. The first end 14 thereof is substantially closed although there are some apertures therein, the reasons for which will become clearer hereinafter. The other end 16 of the outer body member 12 is open. An opening 18 is formed in the side wall of the body member 12 adjacent the first or inner end thereof.

The body member 12 also includes a support or mounting ring 20. As shown most clearly in FIGS. 3-5, this mounting ring 20 is utilized to help mount the dispenser 10 in the lower portion of a container 22. The container 22 is, in fact, in two parts: the upper portion 24 contains a supply of fluid material and the lower portion 26 contains no such material but is used solely to contain the dispener 10.

Figure 3:
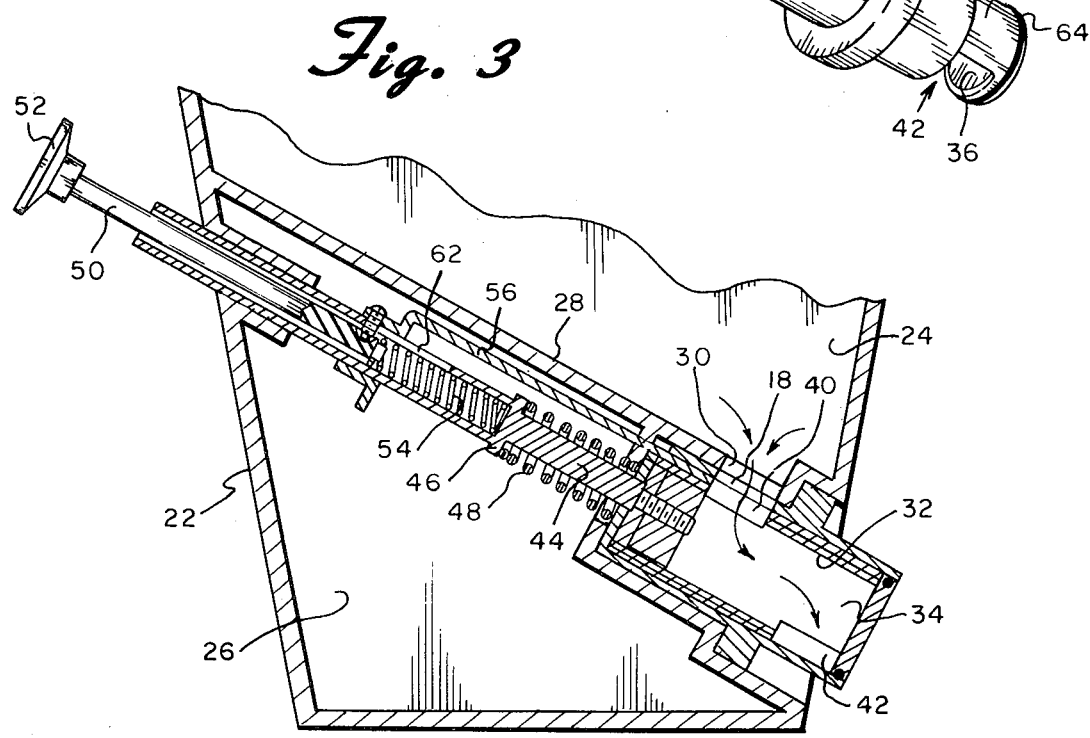
FIG. 3 is a cross-sectional view showing the dispenser mounted in a container and illustrating the operation thereof.

As shown in FIGS. 3-5, the dispenser 10 is preferably mounted at an incline directly beneath the inclined bottom wall 28 of the container portion 24. An opening 30 in the wall 28 directly overlies and coincides with the opening 18 in the side wall of the outer cylindrical body member 12.

Slidably mounted within the body member 12 is an inner tubular or cylindrically shaped member 32. Inner member 32 has a cavity of dispensing chamber 34 therein and is closed at both ends as shown at 36 and 38. Openings 40 and 42 are formed on opposite sides of the side walls of the inner member 32 and are axially spaced therefrom. When the inner cylindrical member 32 is in the fill position, the opening 40 coincides and communicates with the opening 18 in the outer body member 12. The second opening 42, however, is located totally within the outer body member 12 as shown most clearly in FIG. 3.

Connected to the inner end 38 of the inner cylindrical member 32 and extending outwardly therefrom through an aperture in the end wall 14 of the housing 12 is a plunger 44. A flange 46 mounted on the plunger retains a compression spring 48 between the flange and the end wall 14 of the body 12 so as to continuously bias the plunger outwardly and thus the inner cylindrical member 32 into the fill position shown in FIGS. 1 and 3.

The upper free end of the plunger 44 is cylindrically shaped and hollow. Located within this hollow spaced is a second elongated plunger 50 having a knob 52 at its free outer end. A compression spring 54 having a compression force significantly less than the force of spring 48 is located between the inner end of the plunger 50 and the inner surface of the flange portion 46 so as to continuously bias the plunger 50 rearwardly. The forward end of plunger 50 also is securely fixed to a slide closure member 56. This is accomplished by a collar 58 at the free end of the closure member 56 which freely fits around the plunger 44 but which is secured to the plunger 50 by way of a screw 60 which passes through an elongated slot 62 in the wall of the plunger 44.

The forward end of the slide closure 56 passes through an aperture in the rear wall 14 of the outer cylindrically shaped body member 12 and in its normally rearwardly biased position such as shown in FIGS. 1 and 3, the slide member 56 does not interfere with the openings 18 and 40 in the inner and outer cylindrical members 12 and 32, respectively. However, when knob 52 and, therefore, plunger 50 is moved inwardly, the slide closure member 56 also moves inwardly and positions itself between the openings 18 and 40 to thereby close communication between the two openings. As a result of the compound plunger mechanism and the relative compression forces of the springs 48 and 54, the slide closure member 56 moves into place prior to any movement of the dispensing mechanism itself as will become clearer hereinafter.

The operation of the fluid dispenser 10 is, perhaps, best understood from FIGS. 3-5. FIG. 3 shows the dispenser 10 mounted on a container in the manner described above and with the dispenser in its fill position which is its normal rest position. In this position, fluid material from within the container portion 24 flows down the inclined wall 28 through the opening 30 therein, through the opening 18 in the outer cylindrical member 12 and through the opening 40 into the chamber 34 in the inner cylindrical member 32. This chamber 34 is of a particular predetermined volume such as one tablespoon or any other desired amount.

When it is desired to dispense the material within the chamber 34, knob 52 is pushed inwardly against the force of spring 54. This moves the slide closure member 56 under the opening 18 and over the opening 40 so as to close communication therebetween. At this point, no further material can flow from the container portion 24 into the chamber 34. This is clearly shown in FIG. 4. It should be noted that, at this point, the inner cylindrical member 32 is still in its normally biased inwardly position and has not, as yet, moved.

As the knob 52 is pushed further downwardly, plunger 44 begins to be moved against the force of spring 48. In turn, the inner cylindrical member 32 moves downwardly until the lower end thereof extends beyond the end 16 of the outer cylindrical member 12. At this point, the opening 42 in the inner member 32 is exposed and the fluid material which was within the cavity 34 flows out and is dispensed. At all times during this procedure, the slide closure member 56 closes the opening 18 and prevents further material from flowing from the container portion 24. When the knob 52 is released, the device returns to its original position shown in FIG. 3.

In order to utilize the present invention for dispensing liquids, an O-ring 64 is positioned around the circumference of the end 36 of the inner member 32. This provides a liquid seal between the inner member 32 and outer member 12 as shown in FIG. 3. Similar seals may also be used at the other end of the inner and outer cylindrical members, if desired.

The present invention may be embodied in other specific forms without departing from the spirit or essential attributes thereof and accordingly, reference should be made to the appended claims rather than to the foregoing specification as indicating the scope of the invention.

I claim:

1. A dispenser for dispensing fluent material comprising:
an outer tubularly shaped body member including an opening in a side wall adjacent the first end thereof and having a second open end;
an inner tubularly shaped member within said outer member and axially movable with respect thereto, both ends of said inner member being closed, a first opening in a side wall of said inner member adjacent the first end thereof and a second opening in an opposite side wall adjacent the second end thereof;
means for biasing said inner member toward the first end of said outer member to a fill position wherein the opening of said outer member coincides with said first opening of said inner member and wherein the portion of said inner member having said second opening is within said outer member;
a plunger means extending from the first end of said outer member and being connected to said inner member for moving said inner member to a dispensing position wherein the portion of said inner member having said second opening extends outward beyond the second end of said outer member, and
a closure means for closing communication between the opening in said outer member and said first opening in said inner member prior to movement of said inner member.

2. The dispenser as claimed in claim 1 wherein said closure means is a slide closure carried by said plunger means.

3. The dispenser as claimed in claim 1 wherein said inner and outer tubular members are cylindrically shaped.

4. The dispenser as claimed in claim 3 further including an O-ring located between said inner and outer members adjacent said second ends thereof.

* * * * *